(12) United States Patent
Barredo

(10) Patent No.: US 9,205,623 B2
(45) Date of Patent: Dec. 8, 2015

(54) EMBOSSED ABSORBENT PAPER WITH MIXED PATTERNS

(75) Inventor: Donald Barredo, Ingersheim (FR)

(73) Assignee: SCA TISSUE FRANCE, Saint-Ouen (FR)

( * ) Notice: Subject to any disclaimer, the term of this patent is extended or adjusted under 35 U.S.C. 154(b) by 1008 days.

(21) Appl. No.: 13/375,943

(22) PCT Filed: Jun. 3, 2010

(86) PCT No.: PCT/EP2010/057782
§ 371 (c)(1),
(2), (4) Date: Jan. 19, 2012

(87) PCT Pub. No.: WO2010/139759
PCT Pub. Date: Dec. 9, 2010

(65) Prior Publication Data
US 2012/0114908 A1    May 10, 2012

(30) Foreign Application Priority Data
Jun. 4, 2009  (FR) ..................... 09 53683

(51) Int. Cl.
*B32B 3/30*  (2006.01)
*B32B 29/00*  (2006.01)
*B31F 1/07*  (2006.01)

(52) U.S. Cl.
CPC ........... *B31F 1/07* (2013.01); *B31F 2201/0733* (2013.01); *B31F 2201/0735* (2013.01); *B31F 2201/0738* (2013.01); *B31F 2201/0766* (2013.01); *B31F 2201/0769* (2013.01); *B32B 29/00* (2013.01); *Y10T 428/24562* (2015.01)

(58) Field of Classification Search
CPC ... Y10T 428/24562; D21H 27/02; B31F 1/07; B31F 2201/0738; B31F 2201/0766; B31F 2201/0769; B31F 2201/0733; B32B 29/00
See application file for complete search history.

(56) References Cited

U.S. PATENT DOCUMENTS

| 3,738,905 A | 6/1973 | Thomas |
| 3,961,119 A | 6/1976 | Thomas |
| 6,261,666 B1 * | 7/2001 | Enderby et al. ............... 428/172 |

FOREIGN PATENT DOCUMENTS

| EP | 1391174 A1 | 2/2004 |
| EP | 1772257 A2 | 4/2007 |
| EP | 2048283 A1 | 4/2009 |

OTHER PUBLICATIONS

PCT International Search Report for International Application No. PCT/EP2010/057782—Filed Jun. 3, 2010; Date of Mailing: Sep. 24, 2010; 3 pgs.

*Primary Examiner* — Donald J Loney
(74) *Attorney, Agent, or Firm* — Drinker Biddle & Reath LLP

(57) ABSTRACT

A sheet of absorbent paper includes at least one first and one second embossed plies of tissue having protuberances on the inward-facing side of the sheet corresponding to cavities on the outer side, with a first type of protuberances on the first ply, the first type of protuberances on the second ply, at least some of the first type of protuberances of the first ply contacting at least some of the first type of protuberances of the second ply, the first ply and the second ply include a second type of protuberances of frustoconical form, the first type of protuberances being partly adjacent to the second type of protuberances, the first type of protuberances of the first ply are aligned in a first direction and the first type of protuberances of the second ply are aligned in a second direction, the two directions forming a non-zero angle alpha between them.

10 Claims, 1 Drawing Sheet

EMBOSSED ABSORBENT PAPER WITH MIXED PATTERNS

Figure 1:
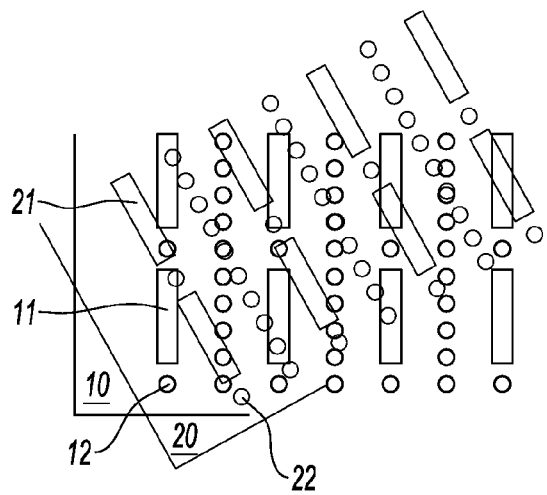

The present invention relates to the field of absorbent papers for sanitary or domestic use, and targets a sheet consisting of at least three plies of absorbent paper, the plies being embossed.

The field of sanitary and domestic paper relates, in a non-limiting way, to products intended to be applied to the skin, such as cosmetic wipes, handkerchiefs, toilet paper, or intended for wiping, such as kitchen roll towel, wiping cloths, or used for the table, such as table napkins. To produce these products, an absorbent paper is used that is obtained by a wet method which is then converted in a manufacturing drying phase. The paper obtained by the wet method, called tissue, is manufactured using conventional techniques known by the acronym CWP, which stands for "conventional wet pressed", or with through-blowing, known by the acronym TAD, which stands for "through air dried". The paper is manufactured more particularly so as to present a certain stretching capability, notably by creping. The stretching capability, conferred by the creping for example, is exploited to emboss the sheet. By embossing, the sheet is permanently deformed in places, in order to obtain notably protuberances on one side of the sheet. The embossing makes it possible to increase the thickness of the sheet but also make it more flexible because of the breaking of interfibre links that is caused by it.

In the development of new products, one goal is to make the sheet softer, gentler to the touch and more attractive, while maintaining or enhancing the functional thickness and strength characteristics in particular. These characteristics can be affected, that is enhanced or degraded, by the embossing process. The embossing operation is performed on paper with low moisture content, that is to say the paper is transformed in the drying part.

Most widely used embossing patterns consist of a repeat, on a geometrical basis, of individual protuberances of small transversal section and of simple geometrical shape. An embodiment thereof can be found in U.S. Pat. No. 5,173,351. This kind of pattern, for which the repeat frequency of the protuberances is high—density of the elements ranging from 5 to 100 protuberances per $cm^2$ depending on whether it is a kitchen towel roll or toilet paper—and of which the surface area of the peaks of the individual protuberances is less than 1 $mm^2$, primarily affects the characteristics associated with the thickness of the sheet, on the one hand, and its rigidity and its strength on the other hand. These patterns make it possible to achieve a good trade-off between the desired improvements in the characteristics when the semi-finished product is converted into a finished product and the industrial running conditions; they make it possible, in particular, to apply an adequate embossing pressure.

A plurality of plies are attached together in order to obtain a thick product. The plies are generally overlaid so that the protuberances face towards the inside of the sheet given that the desired goal is to obtain a surface that is soft to the touch. Moreover, the protuberances between the adjacent plies between them form cavities giving the sheet softness while ensuring a good absorption capability. The protuberances can be either arranged with peaks against peaks in a so-called point/point position which a priori offers the maximum thickness for the sheet. They can also be arranged so as to nest together. The thickness is less than in the point/point position but this arrangement is ideal for applications associated with wiping in which the density of the embossing protuberances is low.

The present invention relates to a product consisting of two plies or more, each having an embossing pattern.

When the desire is to associate two embossed plies in the points to points position, the problem of nesting arises. This term is used to mean the fitting of the protuberances of one ply between the protuberances of the other ply. Nesting is not desirable when assembling the plies points to points.

As stated in U.S. Pat. No. 5,173,351, two plies are linked by making them pass through the clamping interval provided between two identical metal embossing cylinders. The latter are arranged parallel, and driven by means of belts or other, equivalent members so that their rotation speeds are equal and in opposite directions. The driving members are set so that the bosses coincide as exactly as possible in the clamping interval.

When the metal cylinders are perfectly etched and there is no variation in the arrangement of the pins relative to one another, the association is precisely point to point. In reality, the usual etching techniques lead to two types of offset:

A circumferential offset between the pins arranged on one and the same theoretical generatrix of the cylinder. This offset is independent of the density of the pattern.

An axial offset along this generatrix, the amplitude of which, for a certain machining method, varies according to a sinusoidal periodic function with a frequency dependent on the fineness of the pattern. The finer the pattern is, the higher the frequency of the oscillations along the generatrix is.

These manufacturing tolerances have no impact on the quality of the link between the two sheets when the pins have a relatively large contact surface area. In practice, the probability is low of having two pins, of the same index on the two cylinders, so offset from one another that they no longer provide any link.

When the double sheet obtained according to this method is converted into rolls of small width, 10, 20 or 30 cm for example, no unlinked sheets are seen.

When the contact surface areas are very small, entire areas, forming wide strips oriented in the machine direction, are not linked. After transformation into rolls of toilet paper for example, the width of which is less than the width of said strips, products are obtained that are cut within the same strips, which consist of a winding of two unlinked sheets. The consequence of this is a large percentage of waste. U.S. Pat. No. 5,173,351 proposes producing slightly different patterns on the two plies, notably with pitches having a well-defined relationship. In this way, the presence of a contact on an area that can be defined as small as is required is assured.

Document EP 1 772 257 relates to the manufacture of embossed multiply products associated in point/point fashion, the embossing patterns of which are designed so as to likewise avoid the nesting phenomenon. The solution is to emboss the two plies separately according to patterns of which at least a portion has an elongate form in one direction. The directions of each of the plies form an intersection between them.

In this way, a relative variation in the position of the two plies is tolerated. It will be noted that the two patterns are arranged so as to enable the manufacturer to choose between the point/point relationship and the relationship with fitting together of the two patterns.

Other documents describe pattern arrangements having protuberances with elongate forms to avoid the nesting phenomenon between the plies when they are overlaid.

Thus, U.S. Pat. No. 4,671,983 for a roll formed by winding a sheet of paper proposes providing first frustoconical protuberances distributed evenly on the sheet and second protuberances of elongate form between the first protuberances. The latter greatly reduce the nesting between the turns of the roll.

U.S. Pat. No. 3,738,905 proposes an embossing pattern formed by flat surfaces and cavities. The plies are associated along flat surfaces arranged along continuous lines.

When the sheet consists of at least two plies, a certain rigidity is, however, observed.

The problem that the invention seeks to solve is therefore how to produce a sheet of paper having at least two embossed plies, according to a pattern formed at least partly by elongate protuberances in the plane of the sheet, the rigidity of which is controlled.

According to the invention, this problem is solved with a sheet of absorbent paper comprising at least one first and one second embossed plies of tissue, with a basis weight of between 10 and 40 g/m², each of the plies comprising protuberances on the inward-facing side of the sheet corresponding to cavities on the outer side, with first protuberances on the first ply of elongate form, first protuberances on the second ply of elongate form, at least some of the first protuberances of the first ply being in contact with at least some of the first protuberances of the second ply. The sheet according to the invention is characterized in that the first ply and the second ply each comprise second protuberances of frustoconical form, at least some of the first protuberances being at least partly adjacent to the second protuberances, that the first protuberances of said first ply are aligned in a first direction and the first protuberances of said second ply are aligned in a second direction, the two directions forming a non-zero angle alpha between them, at least some of the second protuberances forming alignments interposed between two alignments of first protuberances.

The expression "frustoconical form" should be understood to mean protuberances with circular section parallel to the plane of the sheet but also oval or polygonal, notably square, section and of which the ratio of the greatest dimension to the smallest is low, less than 2.

The expression "adjacent protuberances" is used to describe neighbouring protuberances in the immediate vicinity of one another with no other protuberance between them.

The expression "elongate protuberances" is used to describe protuberances whose section, taken parallel to the plane of the sheet, forms a line or a segment. The ratio of the dimension in the lengthwise direction to the dimension transversal to the line, that is to say the width, is greater than 3. It is preferably greater than 5. The length of the line or of the segment is, also preferably, in a ratio less than 20 and more particularly less than 10 to the width; this line may be closed.

By virtue of the invention, the crossing of the elongate protuberances which ensures contact between the two plies is exploited, in that the alignments between the elongate protuberances of the two plies form a sufficiently large angle. The best efficiency is obtained with a crossing at right angles.

Different embodiments can be envisaged. The following characteristics are considered individually or in combination.

At least some of the second protuberances form alignments interposed between two alignments of first protuberances.

The first protuberances are arranged to alternate, along an alignment, with at least one second protuberance.

The first protuberances are in segment form, the segments being parallel to each other.

Said segments are isolated and do not intersect.

Said segments are rectilinear or with a curved portion.

The width of the first protuberances is equal to that of the second protuberances.

The length of a first protuberance is between 3 and 20 times the width of a second protuberance, preferably between 3 and 10 times, and more particularly between 5 and 10 times.

The first protuberances of the first ply are identical to the first protuberances of the second ply.

The sheet of absorbent paper comprises at least one third embossed ply, overlaid on the second ply. Preferably the third ply includes first and second protuberances, the orientation of the first protuberances of the third ply being the same as the orientation of the first protuberances of the first ply.

The sheet of paper in which at least one of the plies includes third protuberances, the height of the third protuberances being greater than those of the first and second protuberances.

The invention will be better understood, and other aims, details, characteristics or benefits of the latter will become more clearly apparent from the following detailed explanatory description of the embodiments of the invention, given by way of purely illustrative and non-limiting examples, with reference to the appended diagrammatic drawings.

Figure 2:
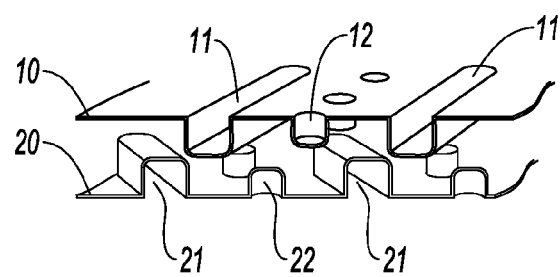
Figure 3:
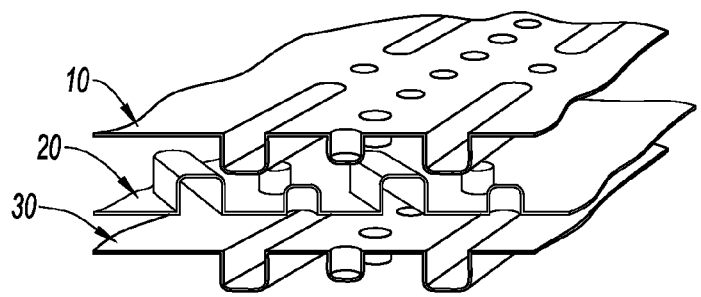
Figure 4:
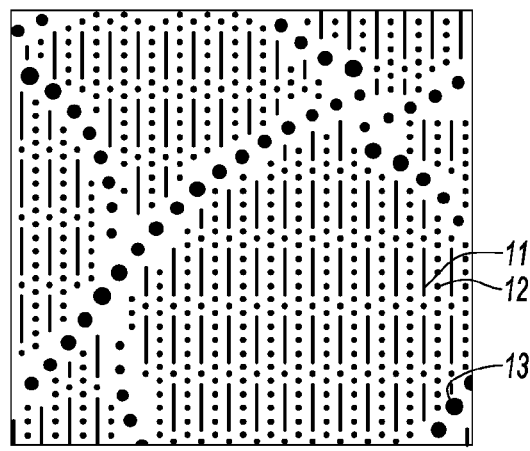

In these drawings,

FIG. 1 represents a sheet of paper with two plies seen from above with the design of the protuberances of each of the plies, that of the bottom ply being formed by thin lines, FIG. 2 is a cross-sectional view of FIG. 1, FIG. 3 is a cross-sectional view of a sheet according to the invention consisting of three plies, and FIG. 4 is a plan view of a sheet according to the invention, one of the plies including third protuberances.

FIG. 1 illustrates the relative positioning of the two plies 10 and 20 forming a sheet 1. The two plies are of absorbent paper, advantageously creped tissue paper. For this type of application, the basis weight of the paper is between 10 and 40 grams per m².

A first ply 10 is embossed with an embossing pattern formed by first protuberances 11 and second protuberances 12. The second ply is embossed with an embossing pattern formed by first protuberances 21 and second protuberances 22. The first protuberances 11, 21 are in segment form, in this case rectilinear, and the second protuberances are of frustoconical form with oval section, parallel to the plane of the sheet. The length of the first protuberances is, in this example, in a ratio of four to the length of the second protuberances. The protuberances have substantially the same widths.

The first protuberances 11 form alignments of mutually parallel segments, separated by alignments of discs of the second protuberances 12. Thus, the pattern of the first ply 10 presents an alternation of first protuberances 11 and second protuberances 12. This alternation is both in the lengthwise direction of the segments 11 and in their widthwise direction.

As can be seen in FIG. 2, which is a cross section of the sheet of FIG. 1 in the direction II-II, the height of the first protuberances 11 is, in this example, the same as that of the second protuberances 12. However, it is also possible in the subject matter of the invention to produce shorter second protuberances of lesser height.

The two patterns are in this example identical, with this difference that the pattern of the bottom ply 20 of the figure is rotated by an angle alpha relative to the pattern of the top ply 10. The angle is defined between the main directions over two patterns.

The embossing is produced by deformation of the plies, each on an etched rigid embossing cylinder. The etching consists of pins, in relief on the surface of the cylinder, corresponding to the protuberances to be obtained.

Given that the desire is to obtain a fabric appearance, it is determined that the first protuberances 11 or 21 must have a width of between 0.2 mm and 1.2 mm. The corresponding width of the second protuberances 12 or 22 is, for example, equal to that of the first protuberances.

The spacing between two adjacent pins measured at the level of their base is preferably at least equal to 0.15 mm.

The contact between the two plies is ensured by the first protuberances 11 and 21 of the two plies. In order to ensure the existence of at least one contact, an angle alpha is determined according to the length "l" of the first protuberances 11 and 21 and the distance "e" separating two first adjacent protuberances 11 and 21 in the direction perpendicular to the main direction of the latter, the cross direction for this example. The angle α is thus chosen such that sin α is at least equal to the ratio e/l.

$$\sin \alpha < \text{or} = e/l$$

FIG. 2 shows the cross section of a sheet with two plies, but it is preferred to associate therewith a third embossed ply 30 with a pattern having the same alignments of first and second protuberances as the first ply and to arrange it with the same orientation as the first ply. This embodiment is represented in FIG. 3.

Thus, in a noteworthy way, a paper is obtained that is:
thick, because of the triple thickness,
well attached, therefore with marked fabric appearance and feel,
and that is flexible, thanks to the mixed embossing of first protuberances and second protuberances. In practice, the flexibility can be adjusted by altering the ratio between the first and second protuberances.

The invention is not limited to the embodiment represented. The first protuberances can have a curvilinear form or even a closed form. The curvilinear form may be that of a capital "S". The first protuberances remain aligned.

If, on the two outer plies, the patterns are the same, all that is needed is an offset between the patterns to ensure a point of contact. Thus, by replacing the first protuberances of the examples illustrated by the figures with first protuberances in "S" form, a lateral or longitudinal offset of the two plies ensures the presence of a contact in the curved parts.

FIG. 4 shows a variant embodiment of a sheet according to the invention in which at least one of the plies includes third protuberances 13. Advantageously, these third protuberances have a height relative to the plane of the sheet that is greater than that of the first 11 and second 12 protuberances.

The invention claimed is:

1. A sheet of absorbent paper comprising at least one first and one second embossed plies of tissue, each of the plies with a basis weight of between 10 and 40 g/m² comprising protuberances on an inward-facing side of the sheet corresponding to cavities on the outer side, with a first type of protuberances on the first ply of elongate form having a length greater than width, the first type of protuberances on the second ply of elongate form having a length greater than width, at least some of the first type of protuberances of the first ply contacting at least some of the first type of protuberances of the second ply, wherein the first ply and the second ply each comprise a second type of protuberances of frusto-conical form,
wherein the first ply comprises a first alignment of first type of protuberances of the first ply and second type of protuberances of the first ply, wherein the first alignment of the first ply includes the lengths of at least two first type of protuberances sharing a first direction and at least one second type of protuberance located between the two first type of protuberances in the first direction,
wherein the second ply comprises a first alignment of first type of protuberances of the second ply and second type of protuberances of the second ply, wherein the first alignment of the second ply includes the lengths of at least two first type of protuberances sharing a second direction and at least one second type of protuberance located between the two first type of protuberances in the second direction, and
wherein the first and second directions form a non-zero angle alpha between them.

2. The sheet of claim 1, wherein the first type of protuberances, on at least one ply, alternate, along the first alignment, on at least one ply, with at least one of the second type of protuberances.

3. The sheet of claim 1, wherein the first type of protuberances form, on at least one ply, isolated segments with no intersection that are parallel with each other.

4. The sheet of claim 3, wherein said segments are rectilinear.

5. The sheet of claim 1, wherein, on at least one ply, the width of the first type of protuberance is equal to a width of the second type of protuberance.

6. The sheet of claim 1, wherein, on at least one ply, the length of the first type of protuberance is between 3 and 20 times the width of the second type of protuberance.

7. The sheet of claim 1, wherein the first type of protuberances of the first ply are similar to the first protuberances of the second ply.

8. The sheet of claim 1, wherein the sheet includes at least one third embossed ply, overlaid on the second ply.

9. The sheet of claim 8, wherein the third ply comprises the first type of protuberances and the second type of protuberances, wherein the third ply comprises a first alignment of first type of protuberances of the third ply and second type of protuberances of the third ply, wherein the first alignment of the third ply includes the lengths of at least two first type of protuberances sharing a third direction and at least one second type of protuberance located between the two first type of protuberances in the third direction, and wherein the first direction and the third direction are the same direction.

10. The sheet of claim 8, wherein at least one of the plies includes a third type of protuberances, a height of the third type of protuberances being greater than the height of the first and second types of protuberances.

* * * * *